United States Patent
Hwang

(10) Patent No.: US 9,690,323 B2
(45) Date of Patent: Jun. 27, 2017

(54) PORTABLE ELECTRONIC DEVICE HAVING A PROTECTIVE FOLDABLE COVER WITH A BUILT-IN MEMBRANE KEYBOARD

(71) Applicant: Richard Hwang, New Taipei (TW)

(72) Inventor: Richard Hwang, New Taipei (TW)

( * ) Notice: Subject to any disclaimer, the term of this patent is extended or adjusted under 35 U.S.C. 154(b) by 0 days.

(21) Appl. No.: 15/151,712

(22) Filed: May 11, 2016

(65) Prior Publication Data
US 2016/0252931 A1 Sep. 1, 2016

Related U.S. Application Data

(63) Continuation of application No. 13/601,505, filed on Aug. 31, 2012, now abandoned.

(51) Int. Cl.
| | |
|---|---|
| G06F 1/16 | (2006.01) |
| A45C 15/00 | (2006.01) |
| H04M 1/18 | (2006.01) |
| H04M 1/23 | (2006.01) |
| A45C 11/00 | (2006.01) |
| H04M 1/02 | (2006.01) |
| H04M 1/04 | (2006.01) |
| H04M 1/725 | (2006.01) |

(52) U.S. Cl.
CPC ............ *G06F 1/1616* (2013.01); *A45C 11/00* (2013.01); *A45C 15/00* (2013.01); *G06F 1/1626* (2013.01); *G06F 1/1632* (2013.01); *G06F 1/1662* (2013.01); *H04M 1/185* (2013.01); *H04M 1/23* (2013.01); *A45C 2011/003* (2013.01); *A45C 2200/15* (2013.01); *G06F 1/1666* (2013.01); *G06F 1/1681* (2013.01); *G06F 2200/1633* (2013.01); *H04M 1/0216* (2013.01); *H04M 1/04* (2013.01); *H04M 1/72527* (2013.01)

(58) Field of Classification Search
CPC .... G06F 1/1616; G06F 1/1662; G06F 1/1632; G06F 1/1626; G06F 2200/1633; G06F 1/1666; H04M 1/23; H04M 1/185; H04M 1/0216; H04M 1/04; H04M 1/72527; A45C 11/00; A45C 15/00; A45C 2200/15; A45C 2011/003
See application file for complete search history.

(56) References Cited

U.S. PATENT DOCUMENTS

| | | | | |
|---|---|---|---|---|
| 4,960,256 A | * | 10/1990 | Chihara | G06F 1/1616 16/361 |
| 5,900,848 A | * | 5/1999 | Haneda | G06F 1/162 345/1.1 |
| 6,480,377 B2 | * | 11/2002 | Genest | G06F 1/1626 345/169 |

(Continued)

*Primary Examiner* — Adrian S Wilson
*Assistant Examiner* — Abhishek Rathod

(57) ABSTRACT

A portable electronic device includes a main body, a protective foldable cover, a membrane keyboard and a folding means. The protective foldable cover is attached structurally in a foldable manner to the main body and further has a foldable leaf to cover the main body. The membrane keyboard is mounted to the foldable leaf by facing the main body and is connected signally with the main body. The folding means is to provide at least one stand state for the main body to stand on the foldable leaf of the protective foldable cover and thus to present the membrane keyboard completely to a position in front of the main body.

5 Claims, 14 Drawing Sheets

(56) References Cited

U.S. PATENT DOCUMENTS

| | | | | |
|---|---|---|---|---|
| 6,604,722 B1* | 8/2003 | Tan | ............. | F16M 11/10 |
| | | | | 248/276.1 |
| 6,690,353 B2* | 2/2004 | Chang | ............. | G06F 1/1626 |
| | | | | 345/156 |
| 6,970,109 B2* | 11/2005 | Wolfson | ............. | G06F 1/1632 |
| | | | | 341/22 |
| 8,050,030 B2* | 11/2011 | Wu | ............. | G06F 1/1616 |
| | | | | 248/917 |
| 2003/0100338 A1* | 5/2003 | Lee | ............. | G06F 1/1626 |
| | | | | 455/556.2 |
| 2006/0007645 A1* | 1/2006 | Chen | ............. | G06F 1/1626 |
| | | | | 361/679.04 |
| 2010/0044259 A1* | 2/2010 | Wang | ............. | A45C 3/02 |
| | | | | 206/320 |
| 2011/0149494 A1* | 6/2011 | Shih | ............. | G06F 1/1632 |
| | | | | 361/679.08 |
| 2011/0267757 A1* | 11/2011 | Probst | ............. | G06F 1/1616 |
| | | | | 361/679.09 |
| 2012/0106078 A1* | 5/2012 | Probst | ............. | G06F 1/1616 |
| | | | | 361/679.56 |
| 2012/0218699 A1* | 8/2012 | Leung | ............. | G06F 1/1616 |
| | | | | 361/679.08 |
| 2012/0275094 A1* | 11/2012 | Zhou | ............. | H04M 1/04 |
| | | | | 361/679.01 |
| 2012/0307441 A1* | 12/2012 | Hung | ............. | G06F 1/1632 |
| | | | | 361/679.09 |

* cited by examiner

FIG.11A

PORTABLE ELECTRONIC DEVICE HAVING A PROTECTIVE FOLDABLE COVER WITH A BUILT-IN MEMBRANE KEYBOARD

RELATED CASES

This is a continuation of co-pending Ser. No. 13/601,505, filed on Aug. 31, 2012, whose disclosures are incorporated by this reference as though fully set forth herein.

BACKGROUND OF THE INVENTION (1) Field of the Invention

The invention relates to a portable electronic device having a protective foldable cover with a built-in membrane keyboard, and more particularly to the portable electronic device who presents the membrane keyboard at a stand state thereof supported by the protective foldable cover.

(2) Description of the Prior Art

In the art, application of the keyboard, in particular the QWERTY keyboard, can be widely seen in most of the electronic devices. Also, for versatile input methods in this field, the keyboard input is always the most feasible and comfortable means for users of any kind of electronic devices. It is obvious that the application of keyboards can have no problem to the table-top or larger-sized electronic devices, but yet problems arise while the electronic device is miniaturized into a potable size. Apparently, space for accommodating a solid keyboard is merely found for those portable electronic devices, such as cellular phones, flat or tablet PCs, PDAs and so on.

Now, various efforts have been made to provide a keyboard as the main or auxiliary input means for the portable electronic devices. One of those efforts can be seen in the RIM Blackberry. As shown in FIG. 1, a schematic view of a typical Blackberry 1 is illustrated. The Blackberry 1 has a miniaturized, but in a full scale, QWERTY keyboard 2 located lower to the screen 3 thereof. Though the built-in keyboard 2 makes easy for input to be shown on the screen 3, yet the size of the Blackberry 1 has made cumbersome to the finger input to the keyboard 2, and also a limited screen size can only be provided to the Blackberry 1.

Another effort is shown in FIG. 2, in which a full-scaled removable mechanical keyboard 2a as an auxiliary input means is provided in a plug-in form to the portable electronic device 1a. Such a design can be seem in the Samsung Galaxy series and ASUS Transformer Tabs. In this application, though the room on the electronic device for constructing the screen is freed, yet a separate full-scaled keyboard 2a make a tablet or flat PC no difference to a traditional notebook PC. Besides of the higher cost and the increased volume, such a kind of this application has been trading off merits of the tablet PC 2a.

The aforesaid two efforts are devoted to building hardware keyboards to the electronic devices, while the following efforts work on to provide imaged software keyboards.

A further effort is schematically shown in FIG. 3, where a tablet PC 1b with dual screens 3bu and 3bl is illustrated, and in which the touch screen 3bl can be transformed, as required, into an imaged keyboard for inputting to the upper screen 3bu. Such a design can be seen in tablet PCs of Sony, Acer and ICONIA. In this application, though the imaged screen presentable to the lower screen 3bl can provide a keyboard application close to a membrane keyboard, yet it also sacrifices half of displayable screens of the PC to mimic an imaged keyboard. Cost and volume needed to provide such a service make meaningless to the appearance of the dual-screen tablet PC 1b.

Also, a further effort in software keyboard is usually seen to most of high-level mobile phones and tablet PCs. Referred to FIG. 4, the electronic device 1c can provide portion 3c' of the touch screen 3c (the lower part as shown) to be shaded and become a temporary imaged keyboard per an input request. In this application, the imaged keyboard can only be small-sized keyboard which is unfriendly to a finger control, and also part of the displayable screen is sacrificed.

Definitely, more efforts are needed to provide a convenient and friendly keyboard structure for the current portable electronic devices. This present invention is one of this devotion.

SUMMARY OF THE INVENTION

Accordingly, it is an object of the present invention to provide a portable electronic device having a protective foldable cover with a built-in membrane keyboard for facilitating finger input in a traditional keyboard manner.

In the present invention, the portable electronic device includes a main body, a protective foldable cover, a membrane keyboard and a folding means. The protective foldable cover is attached structurally in a foldable manner to the main body and further has a foldable leaf to cover the main body. The membrane keyboard is mounted to the foldable leaf by facing the main body and is connected signally with the main body. The folding means is to provide at least one stand state for the main body to stand on the foldable leaf of the protective foldable cover and thus to send the membrane keyboard completely to a position in front of the main body.

In the present invention, the membrane keyboard and the main body can be signally connected through a predetermined connection means.

In one embodiment of the present invention, the predetermined connection means between the membrane keyboard and the main body can be a USB connection means.

In one embodiment of the present invention, the predetermined connection means between the membrane keyboard and the main body can be a connection means wired through the protective cover.

In one embodiment of the present invention, the predetermined connection means between the membrane keyboard and the main body can be a wireless connection means applying signals in radio frequencies, infra-red frequencies, ultrasonic frequencies, and so on.

In one embodiment of the present invention, the predetermined connection means between the membrane keyboard and the main body can be a Bluetooth connection means.

In one embodiment of the present invention, the membrane keyboard can have a thickness (i.e. height) ranged from 0.4 mm to 2.0 mm, preferably from 0.4 mm to 0.8 mm.

In one embodiment of the present invention, the folding means can include at least one notch groove on the foldable leaf for locating a lower end of the main body while the electronic device is in the stand state.

In one embodiment of the present invention, the folding means can be formed as a sliding mechanism constructed along one lateral side of the main body. The sliding mechanism can further have a pivotal end located at the lateral side, a slider end sliding along a sliding groove at the lateral side, and two pivotal bars connecting the slider end and the pivotal end. Preferably, the locating groove can further have a plurality of anchoring recesses for the slider end to lock on the sliding mechanism.

All these objects are achieved by the portable electronic device having a protective foldable cover with a built-in membrane keyboard described below.

BRIEF DESCRIPTION OF THE DRAWINGS

The present invention will now be specified with reference to its preferred embodiment illustrated in the drawings, in which:

FIG. 11A is a schematic view of yet a further embodiment of the portable electronic device having a protective foldable cover with a built-in membrane keyboard in accordance with the present invention, in a stand state.

DESCRIPTION OF THE PREFERRED EMBODIMENT

The invention disclosed herein is directed to a portable electronic device having a protective foldable cover with a built-in membrane keyboard. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
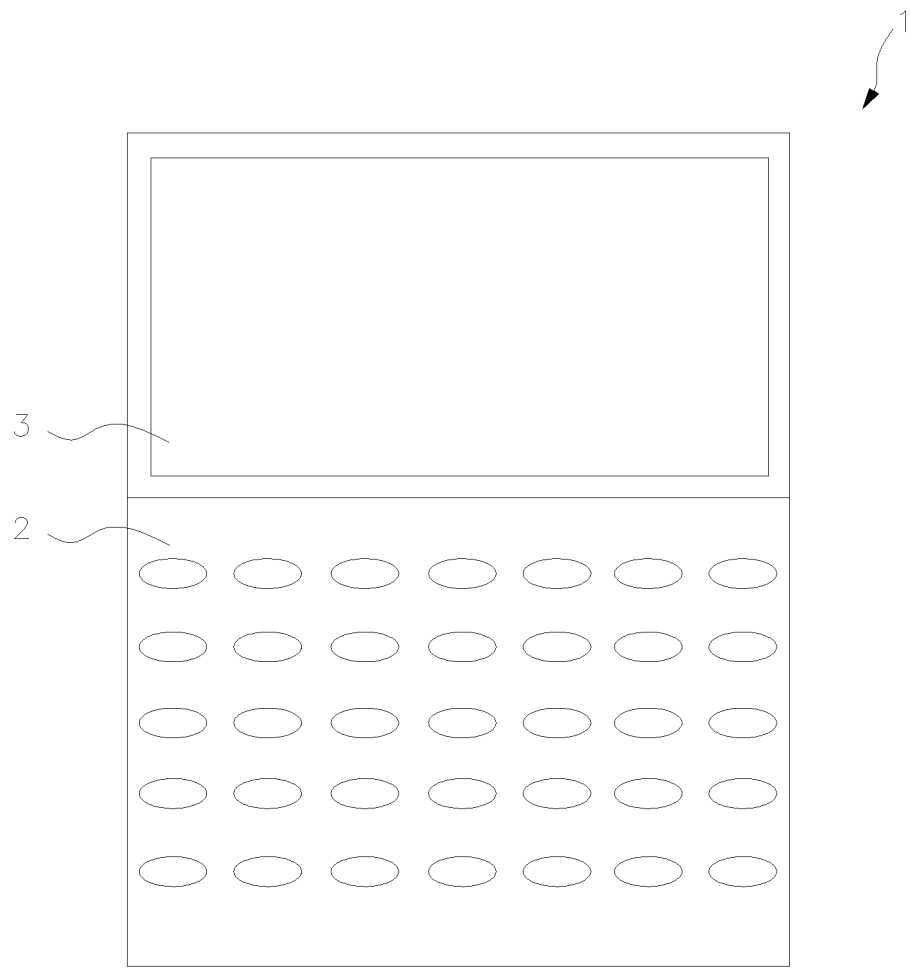
FIG. 1 is a schematic view of a typical RIM Blackberry.
Figure 2:
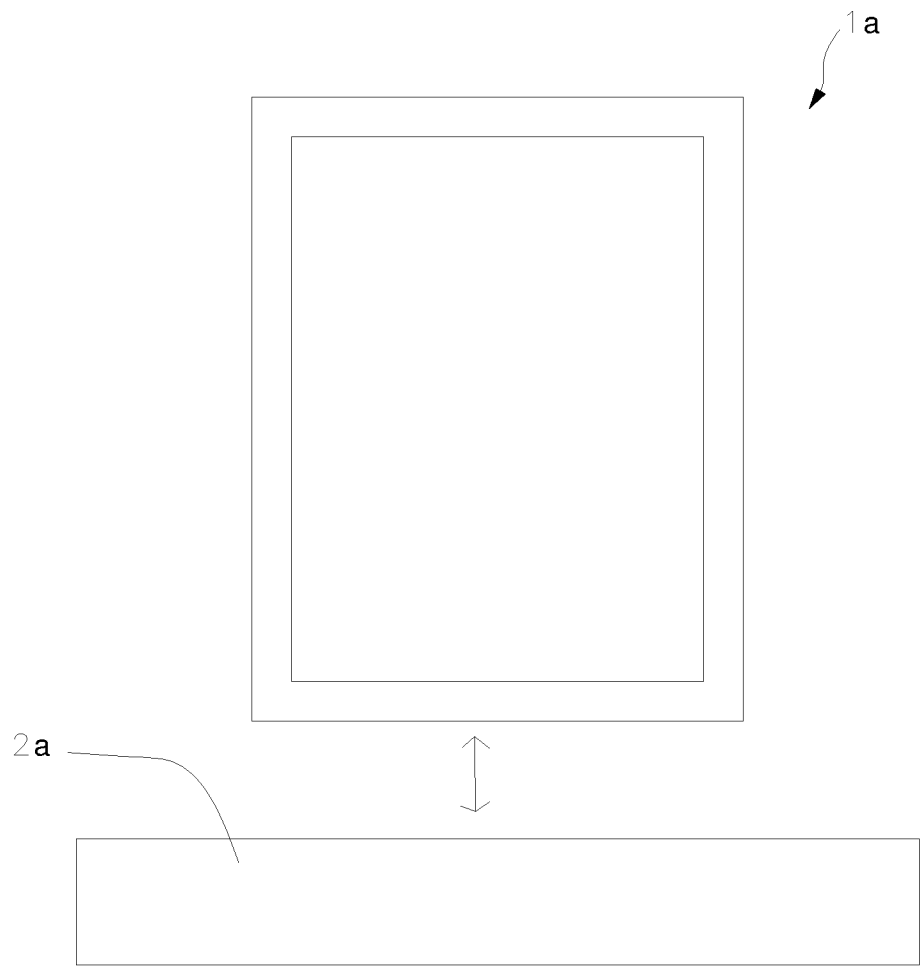
FIG. 2 is a schematic view of a portable electronic device with a removable mechanical keyboard.
Figure 3:
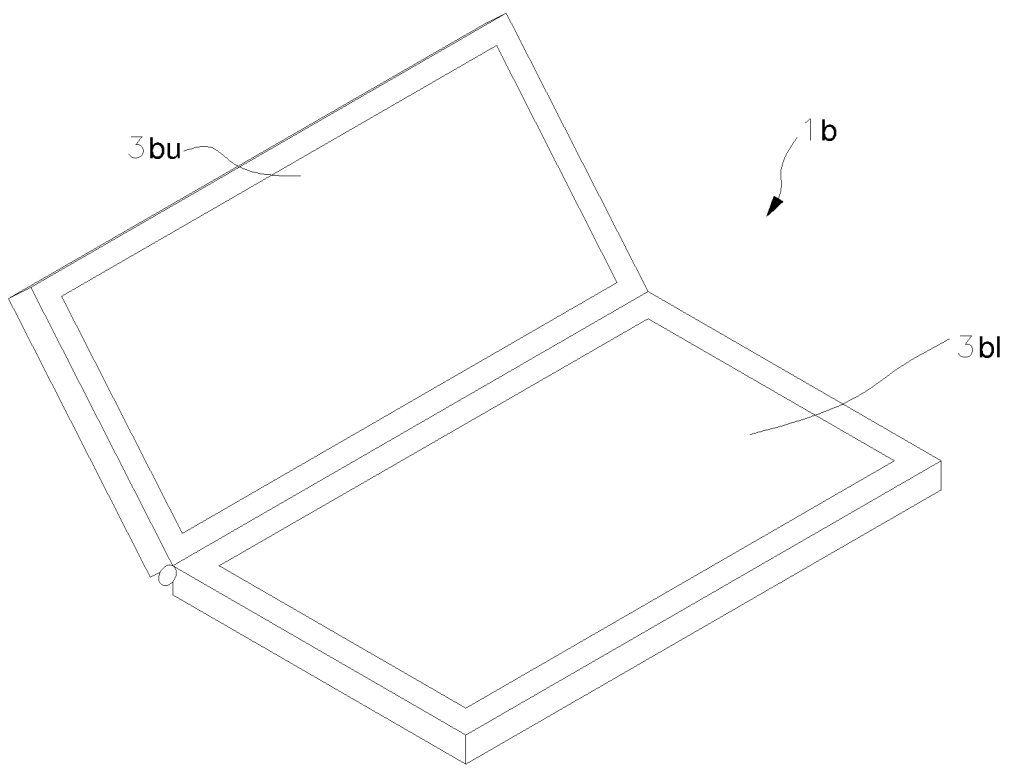
FIG. 3 is a schematic view of a portable electronic device with dual displayable screens.
Figure 4:
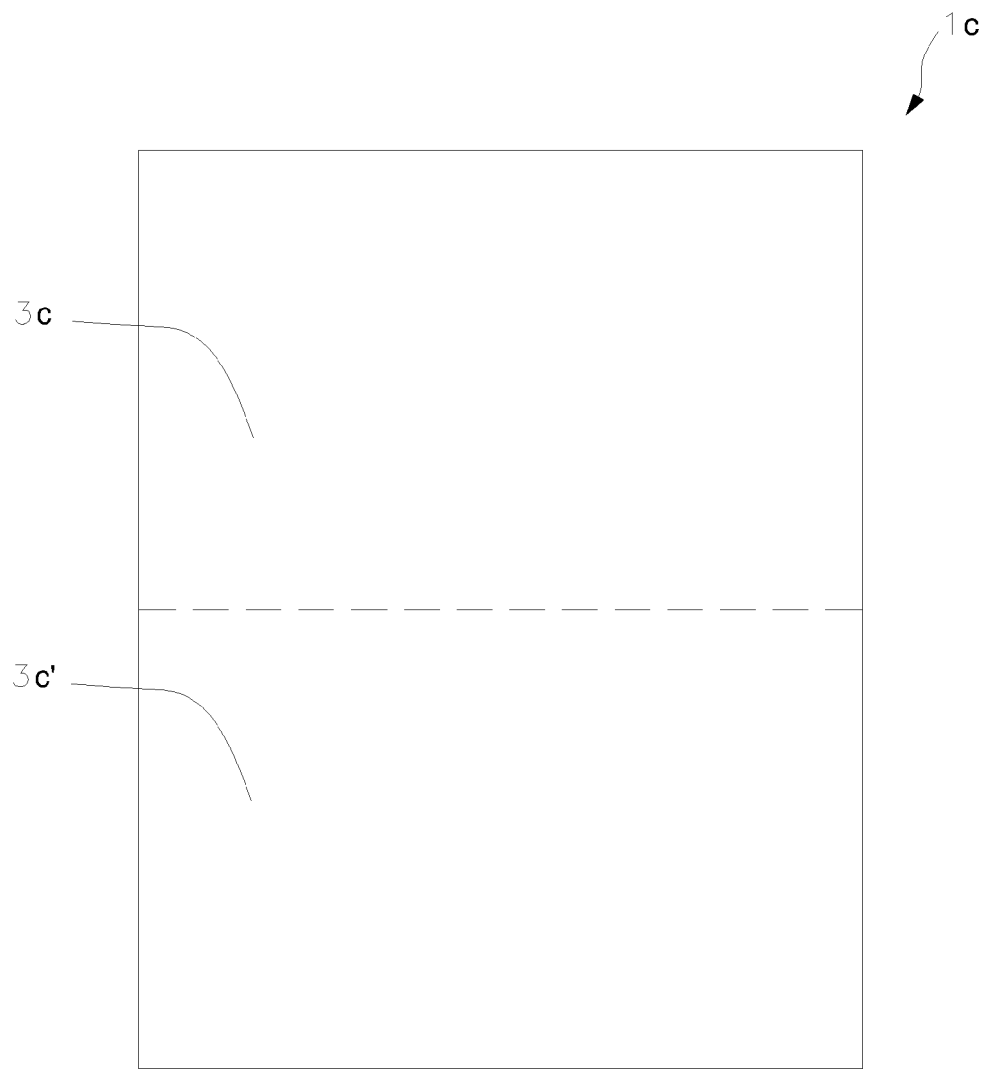
FIG. 4 is a schematic view of a portable electronic device with a single touch screen.
Figure 5A:
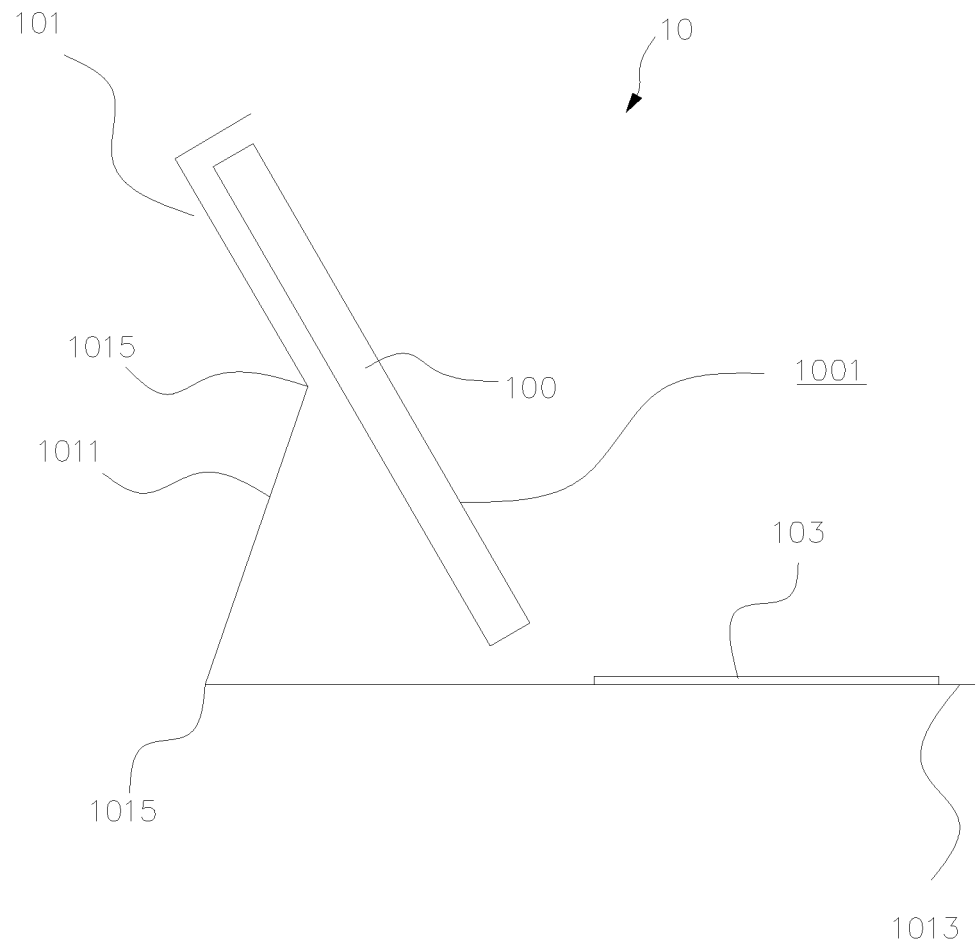
FIG. 5A is a schematic view of a preferred embodiment of the portable electronic device having a protective foldable cover with a built-in membrane keyboard in accordance with the present invention, in a stand state.
Figure 5B:
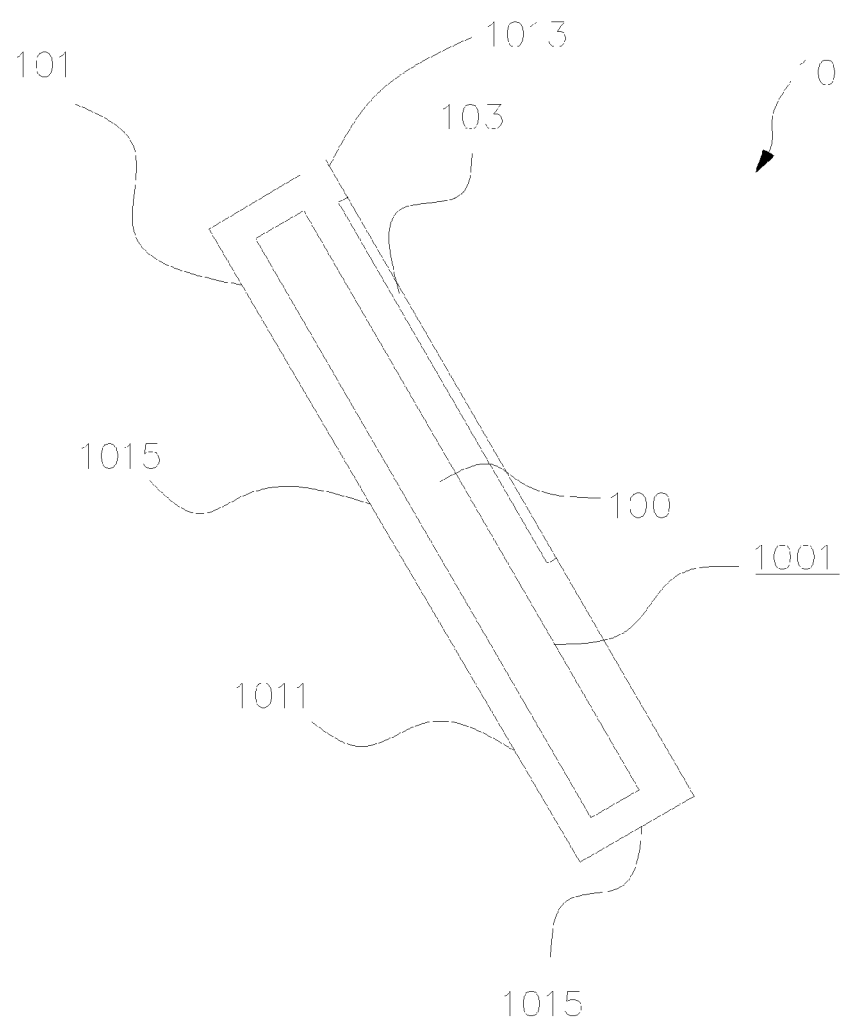
FIG. 5B shows a folded state of FIG. 5A.

Referring now to FIG. 5A and FIG. 5B, schematic views of a preferred embodiment of the portable electronic device 10 having a protective foldable cover 101 with a built-in membrane keyboard 103 in accordance with the present invention are illustrated in a stand state and a folded state, respectively. As shown, the portable electronic device 10 includes a main body 100, a protective foldable cover 101, a membrane keyboard 103 and a folding means for changing stand states of the portable electronic device 10.

The main body 100 can be a cellular phone, a flat or tablet PC, a PDA or any the like.

The protective foldable cover 101, attached structurally in a foldable manner to protect the main body 100, further has a back leaf 1011 to be fixed with the main body 100 in an appropriate manner, a foldable leaf 1013 to cover the front surface 1001 of the main body in a foldable way, a plurality of ligament strips 1015 to make possible the folding/unfolding of the protective foldable cover 101. As shown in this embodiment, a ligament strip 1015 is constructed with the back leaf 1011 so as to have the back leaf 1011 able to be folded into two sections as illustrated in FIG. 5A. Also, another ligament strip 1015 is constructed to connect the back leaf 1011 and the foldable leaf 1013 so as to have these two leaves 1011 and 1013 can be angularly folded. The appropriate manner to attach or fix a portion the back leaf 1011 to the main body 100 can be simply a structural wrapping up, a button-on or any relevant structural adhering mechanism.

Figure 6:
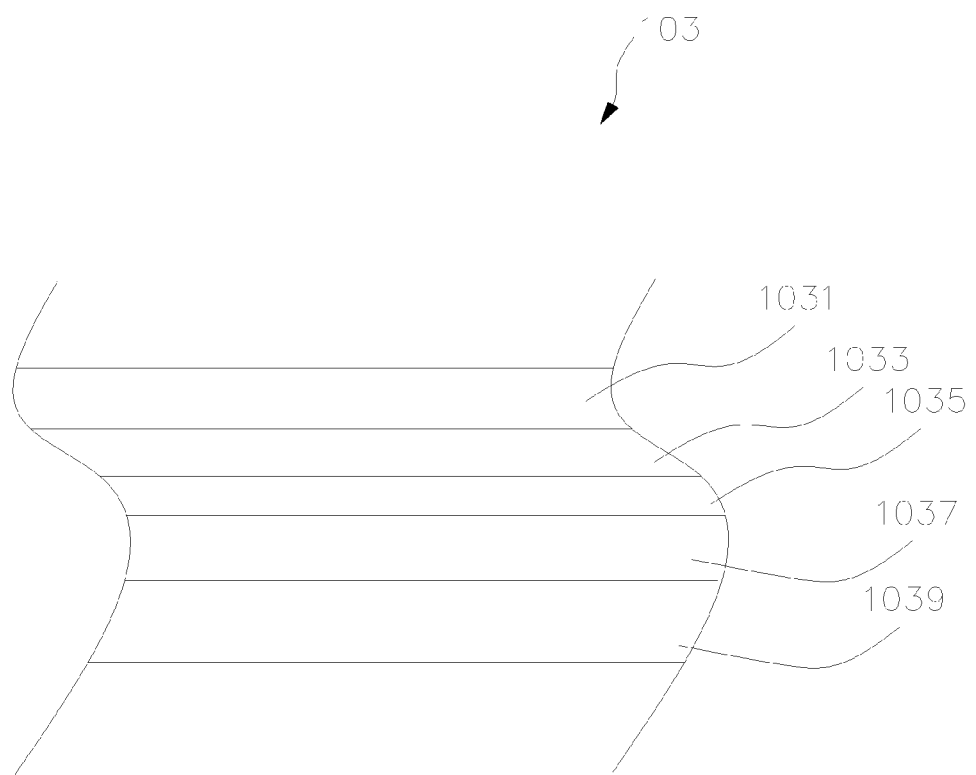
FIG. 6 is a cross-sectional view of the membrane keyboard of FIG. 5.

The membrane keyboard 103 is mounted to the foldable leaf 1013 by facing the front surface 1001 of the main body 100 and is connected signally with the main body 100 by a predetermined communication connection means. In the present invention, the membrane keyboard 103 can have a thickness (i.e. height) ranged from 0.4 mm to 2.0 mm, preferably from 0.4 mm to 0.8 mm. With such a thickness (i.e. height) limitation, the membrane keyboard 103 can be fit to the foldable leaf 103 without forming an obstacle to make difficult the folding of the foldable leaf 103 onto the front surface 1001 of the main body 100. As shown in FIG. 6, the membrane keyboard 103 is in a laminating form to include a top surface plastic layer 1031, an upper thin-film PCB layer 1033, a spacer layer 1035, a lower thin-film PCB layer 1037 and a flat bottom plastic substrate 1039. For the embodiment of the membrane keyboard 103 is already well-known to the ordinary skill person in the art, details thereabout are omitted herein.

Figure 8:
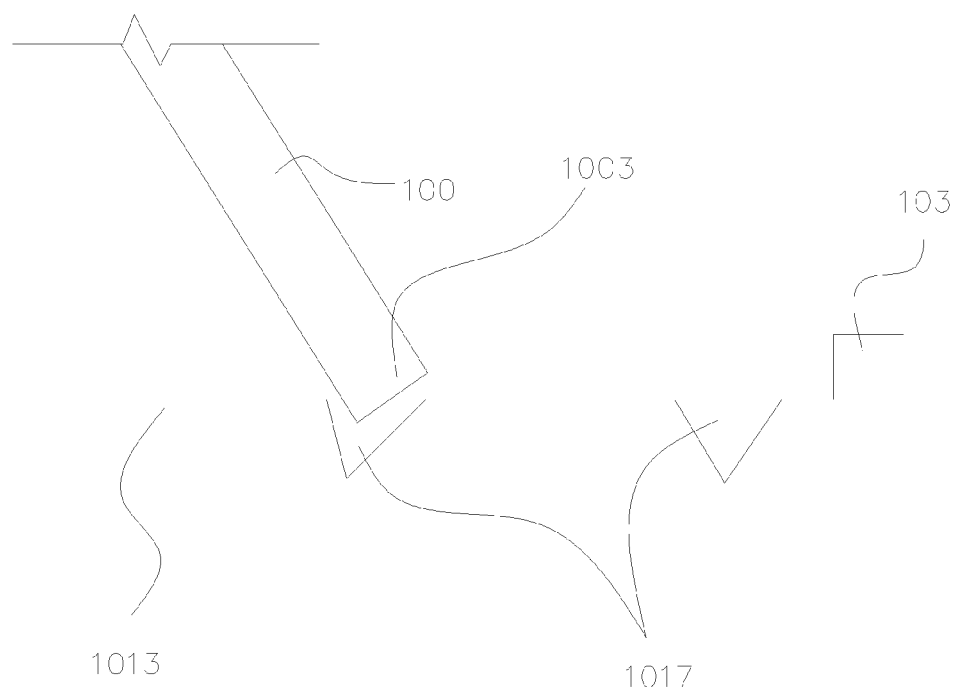
FIG. 8 is an enlarged view on a portion of a stand point of the main body at the foldable leaf of FIG. 5.

The folding means for folding/unfolding the protective foldable cover 101 is to provide at least one stand state for the main body 100 to stand on the foldable leaf 1013 and thus to send the membrane keyboard 103 completely to a position in front of the main body 100 as the stand state shown in FIG. 5A. Structurally, the purpose of the folding means is carried out by the arrangement of the ligament strips 1015, which is also an already-known art and thus omitted herein. Referring to FIG. 8, an enlarged view on a portion of a stand point of the main body 100 at the foldable leaf 1013 is shown. As illustrated, the folding means can include at least one notch groove 1017 on the foldable leaf 1013 for locating a lower end 1003 of the main body 100 while the electronic device is in the stand state. Definitely, the notch groove 1017 is to be arranged between the membrane keyboard 103 and the back leaf 1011.

Figure 7:
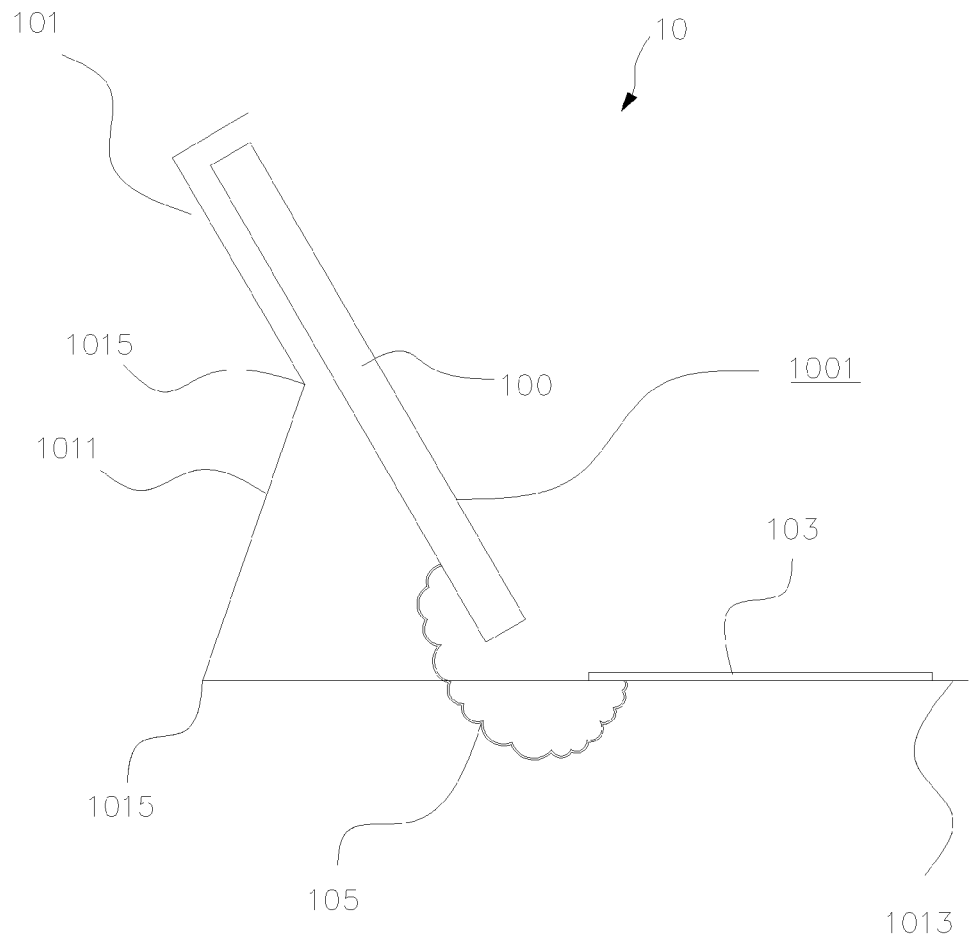
FIG. 7 is a schematic view of FIG. 5 to include a USB connection.

In the present invention, the predetermined communication connection means between the membrane keyboard 103 and the main body 100 can be a wired or wireless means. In the case that a wired connection means is present, the predetermined communication connection means can be one of a USB connection means through a USB cable 105 electrically bridging the main body 100 and the membrane keyboard 103 as shown in FIG. 7. Alternatively, the predetermined communication connection means between the membrane keyboard 103 and the main body 100 can also be a connection means wired through the protective cover. 101; i.e. wired from the membrane keyboard 103, along the foldable leaf 1013, through the back leaf 1011, and to the main body 100 through a relevant electrical connection between the back leaf 1011 and the main body 100.

In the present invention, in the case that the predetermined communication connection means between the membrane keyboard 103 and the main body 100 is a wireless connection means, the wireless connection means can be applying signals in radio frequencies, infra-red frequencies, ultrasonic frequencies, or any relevant frequency domain. In particular, the predetermined communication connection means can be a Bluetooth connection means.

Figure 9A:
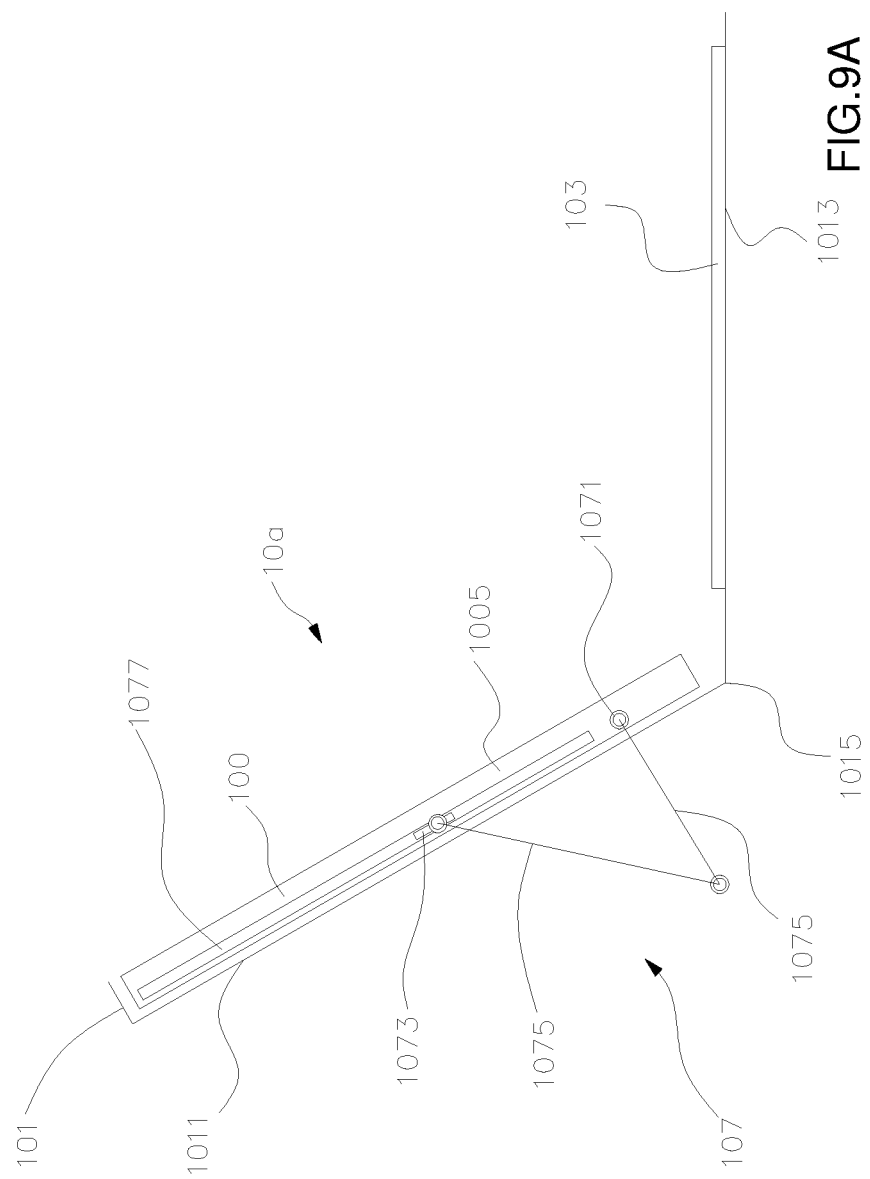
FIG. 9A is a schematic view of another embodiment of the portable electronic device having a protective foldable cover with a built-in membrane keyboard in accordance with the present invention, in a stand state.
Figure 9B:
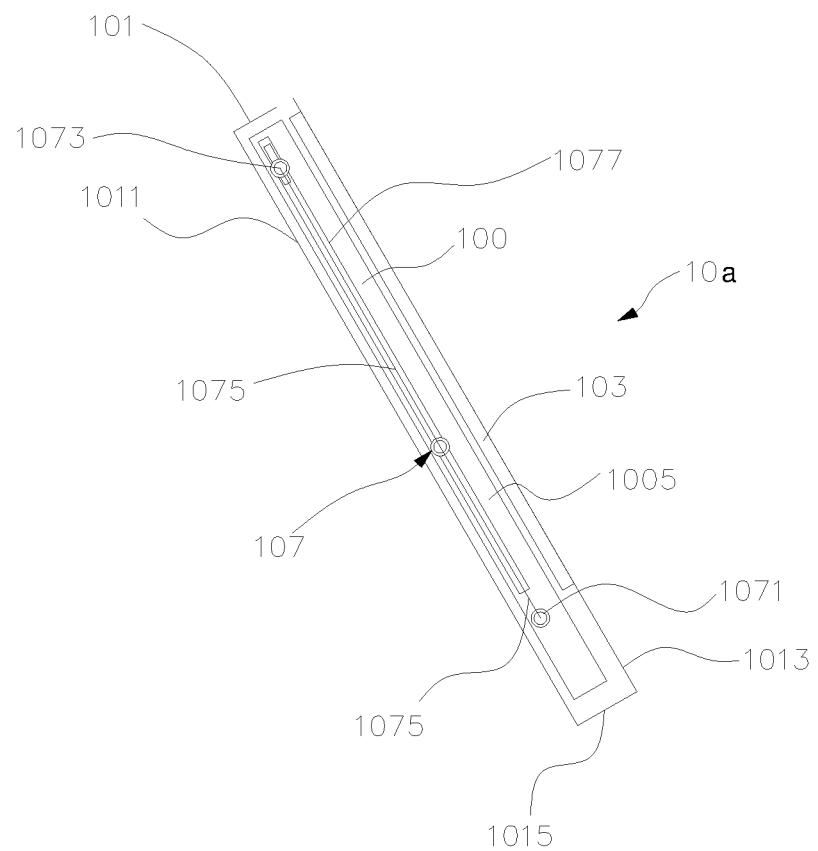
FIG. 9B shows a folded state of FIG. 9A.

Referring now to FIG. 9A and FIG. 9B, schematic views of another embodiment of the portable electronic device having a protective foldable cover with a built-in membrane keyboard in accordance with the present invention are shown in a stand state and a folded state, respectively. In this embodiment, the portable electronic device 10a includes a main body 100, a protective foldable cover 101 attached structurally in a foldable manner to protect the main body 100, a membrane keyboard 103 and a folding means 107 for changing stand states of the portable electronic device 10.

Similar to the aforesaid embodiment of FIG. 5A and FIG. 5B, the main body 100 can be a cellular phone, a flat or tablet PC, a PDA or any the like.

The protective foldable cover 101 further has a back leaf 1011 to be fixed with the main body 100 in an appropriate manner, a foldable leaf 1013 to cover the front surface 1001 of the main body 100 in a foldable way, a ligament strip 1015 to flexibly connect the back leaf 1011 and the foldable leaf 1013. As shown in this embodiment, only one ligament strip 1015 is present to enable the foldable leaf 1013 to be folded angularly with the back leaf 1011, which is formed as a straight protective back plate to the main body 100. The appropriate manner to attach or fix a portion the back leaf 1011 to the main body 100 can be simply a structural wrapping up, a button-on or any relevant structural adhering mechanism.

The membrane keyboard 103 is mounted to the foldable leaf 1013 by facing the front surface 1001 of the main body 100 and is connected signally with the main body 100 by a predetermined communication connection means. Also, the membrane keyboard 103 can have a thickness (i.e. height) ranged from 0.4 mm to 2.0 mm, preferably from 0.4 mm to 0.8 mm. With such a thickness (i.e. height) limitation, the membrane keyboard 103 can be fit to the foldable leaf 103 without forming an obstacle to make difficult the folding of the foldable leaf 103 onto the front surface 1001 of the main body 100.

In this embodiment, the predetermined communication connection means to establish signal connections between the membrane keyboard 103 and the main body 100 can be a wired or wireless means. In the case that a wired connection means is present, the predetermined communication connection means can be a USB connection means, or a connection means wired through the protective cover 101 from the membrane keyboard 103 to the main body 100. In the case that the predetermined communication connection means between the membrane keyboard 103 and the main body 100 is a wireless connection means, the wireless connection means can be applying signals in radio frequencies, infra-red frequencies, ultrasonic frequencies, or any relevant frequency domain. In particular, the predetermined communication connection means can be a Bluetooth connection means.

Figure 10:
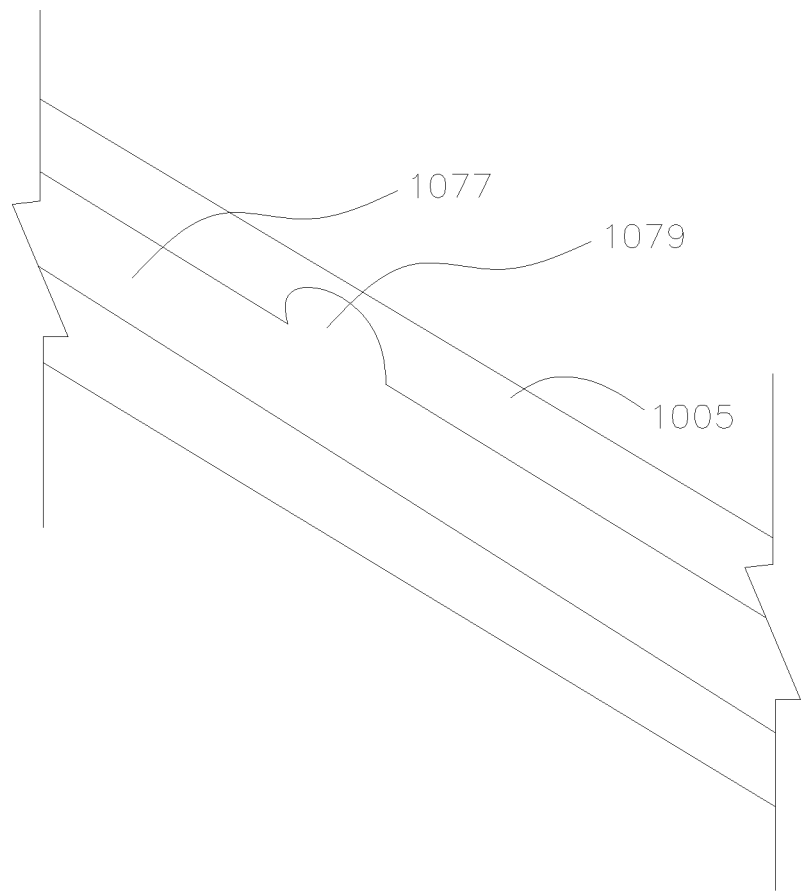
FIG. 10 is an enlarged view of a portion of the sliding groove of FIG. 9.

The folding means 107 for folding/unfolding the protective foldable cover 101 is to provide at least one stand state for the main body 100 to stand on the foldable leaf 1013 and thus to send the membrane keyboard 103 completely to a position in front of the main body 100 as the stand state shown in FIG. 9A. In this embodiment, the folding means 107 can be formed by the ligament strip 1015 and a sliding mechanism constructed along one lateral side 1005 of the main body 100. The sliding mechanism can further have a pivotal end 1071 located at the lateral side 1005, a slider end 1073 sliding along a sliding groove 1077 at the lateral side 1005, and two pivotal bars 1075 connecting pivotally the slider end 1073 and the pivotal end 1071. Upon this arrangement, changing the angle between the two bars 1075 would change the stand state of the main body 100 with respect to the protective foldable cover 101. Preferably, as shown in FIG. 10, the locating groove 1077 can further have a plurality of anchoring recesses 1079 for the slider end 1073 to lock on the sliding mechanism. In the art, various pairs to lock on a slider in a sliding groove can be found. The embodiment of the anchoring recesses 1079 for the slider end 1073 is only one of them to be particularly picked out to demonstrate one of various features of the present invention, and thus shall not limit the application of the present invention in the folding means.

By comparing the former embodiment of FIG. 5A and FIG. 5B and the latter embodiment of FIG. 9A and FIG. 9B, it is noted that the latter embodiment without a bending on the back leaf to achieve a stand state can provide a wider and larger room for constructing the membrane keyboard 103. Actually, almost all the inner surface (upper surface in FIG. 9A) of the foldable leaf 1013 is available for the membrane keyboard 103. Yet, the appearance of the sliding mechanism in the latter embodiment does make cumbersome to the configuration of the electronic device.

In the present invention, the protective foldable cover 101 can also be present in an optional auxiliary part to the electronic device. In such an aspect, the protective foldable cover 101 with a built-in membrane keyboard 103 for a portable electronic device having a main body 100 comprises a foldable leaf 1013 for covering the main body 100, a membrane keyboard 103 mounted to the foldable leaf 1013, a predetermined communication connection means for the membrane keyboard 103 to establish signal connection with the main body 100, and a folding means for providing at least one stand state for the main body 100 to stand on the foldable leaf 1013 of the protective cover 101 and to send the membrane keyboard 103 completely to a position in front of the main body 100.

By providing the protective foldable cover with a built-in membrane keyboard to the portable electronic device in accordance with the present invention, a broader keyboard space can be thus provided to facilitate finger input in a traditional keyboard manner. Thereby, functions in both protection and easy-inputting can be included into a traditional cover to the electronic device, and thus shortcomings in conventional application of the input means to the electronic devices as described in the foregoing background section can be successfully overcome.

Figure 11A:
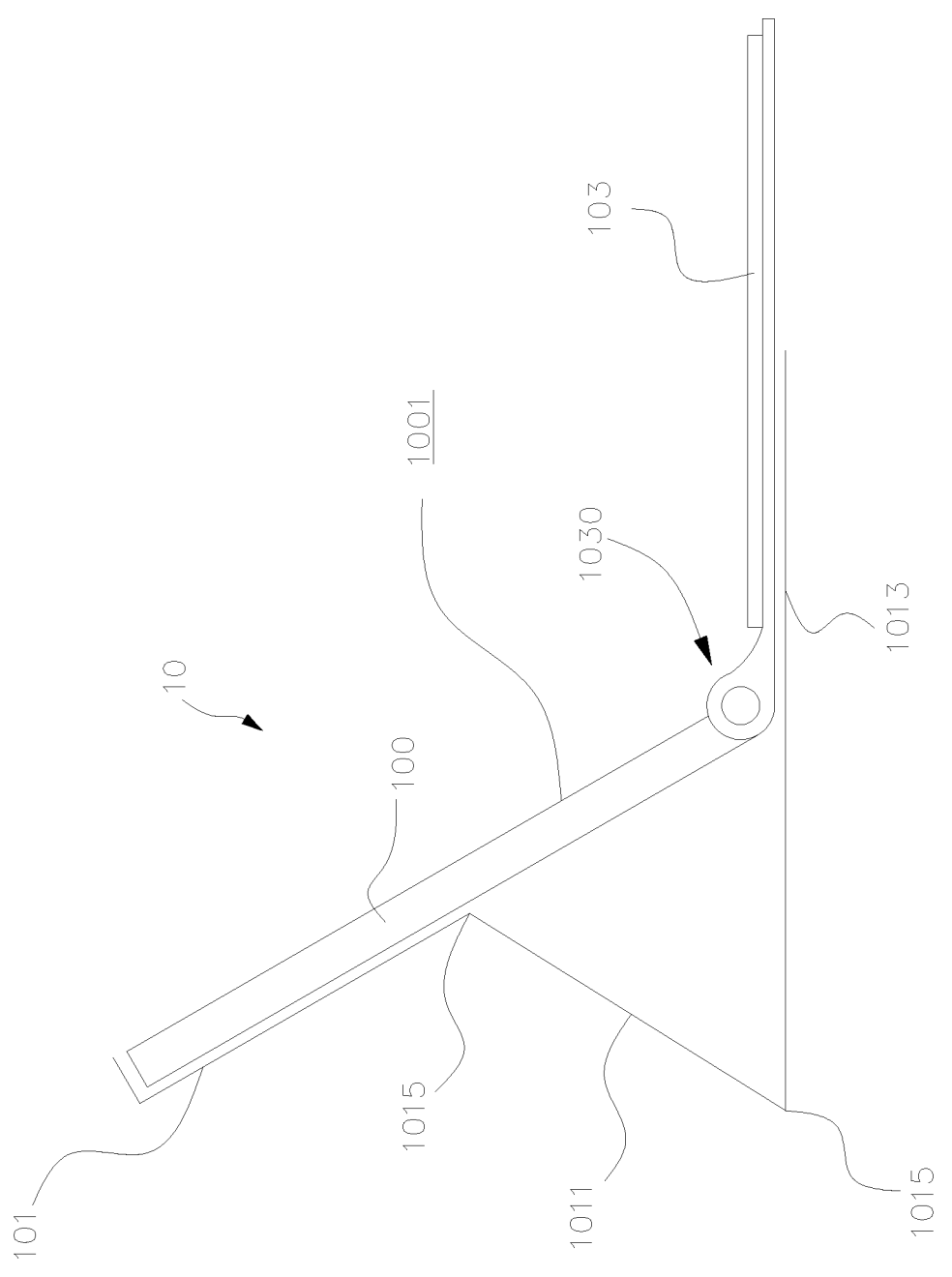
Figure 11B:
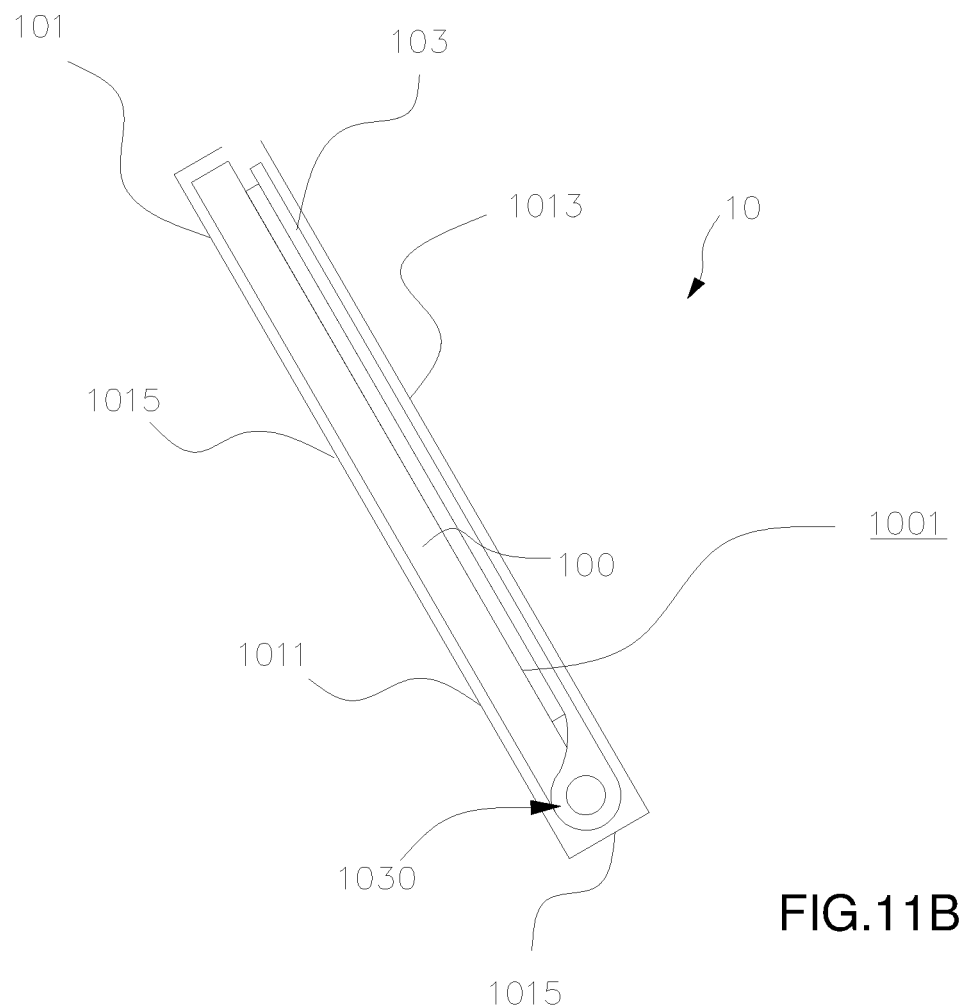
FIG. 11B shows a folded state of FIG. 11A.

Referring now to FIG. 11A and FIG. 11B, schematic views of yet a further preferred embodiment of the portable electronic device 10 having a protective foldable cover 101 with a built-in membrane keyboard 103 in accordance with the present invention are illustrated in a stand state and a folded state, respectively. As shown, similar to the previously described embodiment shown in FIG. 5A and FIG. 5B, the yet further preferred embodiment of the portable electronic device 10 shown in FIG. 11A and FIG. 11B also includes a main body 100, a protective foldable cover 101, a membrane keyboard 103 and a folding means for changing stand states of the portable electronic device 10.

The main body 100 can be a cellular phone, a flat or tablet PC, a PDA or any the like.

The protective foldable cover 101, attached structurally in a foldable manner to protect the main body 100, further has a back leaf 1011 to be fixed with the main body 100 in an appropriate manner, a foldable leaf 1013 to cover the front surface 1001 of the main body in a foldable way, a plurality of ligament strips 1015 to make possible the folding/unfolding of the protective foldable cover 101. As shown in this embodiment, a ligament strip 1015 is constructed with the back leaf 1011 so as to have the back leaf 1011 able to be folded into two sections as illustrated in FIG. 11A. Also, another ligament strip 1015 is constructed to connect the back leaf 1011 and the foldable leaf 1013 so as to have these two leaves 1011 and 1013 can be angularly folded. The appropriate manner to attach or fix a portion the back leaf 1011 to the main body 100 can be simply a structural wrapping up, a button-on or any relevant structural adhering mechanism.

The membrane keyboard 103 is mounted to the foldable leaf 1013 by facing the front surface 1001 of the main body 100 and is connected signally with the main body 100 by a predetermined communication connection means. In this embodiment shown in FIG. 11A and FIG. 11B, a hinge 1030 is furnished between the main body 100 and the membrane keyboard 103. The hinge 1030 has two functions. Firstly, the hinge 1030 is built-in with the communication connection means. That means, the hinge 1030 can provide a structure for electrically connecting the main body 100 and the membrane keyboard 103 in such a manner that, not only the electric power required by the membrane keyboard 103 can be provided by the main body 100 via the communication connection means built within the hinge 1030, but also the input signals generated by pressing the keyboard 103 can be transmitted to the main body 100 via the communication connection means built within the hinge 1030. Secondly, the hinge 1030 also provides a structure for physically connecting the main body 100 and the membrane keyboard 103 in a rotatable manner. Such that, the membrane keyboard 103 can pivot about the hinge 1030 and rotate between the aforementioned stand state and folded state. Preferably, the hinge 1030 allows the membrane keyboard 103 to be open/unfolded to any desired angle relative to the main body 100, and then fixes the relative angle between the membrane keyboard 103 and the main body 100, no matter with or without the protective foldable cover 101.

In the present invention, the membrane keyboard 103 can have a thickness (i.e. height) ranged from 0.4 mm to 2.0 mm, preferably from 0.4 mm to 0.8 mm. With such a thickness (i.e. height) limitation, the membrane keyboard 103 can be fit to the foldable leaf 103 without forming an obstacle to make difficult the folding of the foldable leaf 103 onto the front surface 1001 of the main body 100. As shown in FIG. 6, the membrane keyboard 103 is in a laminating form to include a top surface plastic layer 1031, an upper thin-film PCB layer 1033, a spacer layer 1035, a lower thin-film PCB layer 1037 and a flat bottom plastic substrate 1039. For the embodiment of the membrane keyboard 103 is already well-known to the ordinary skill person in the art, details thereabout are omitted herein.

The folding means for folding/unfolding the protective foldable cover 101 is to provide at least one stand state for the main body 100 to stand on the foldable leaf 1013 and thus to send the membrane keyboard 103 completely to a position in front of the main body 100 as the stand state shown in FIG. 11A. In addition, the foldable cover 101 can be folded into the folded state as shown in FIG. 11B.

While the present invention has been particularly shown and described with reference to a preferred embodiment, it will be understood by those skilled in the art that various changes in form and detail may be without departing from the spirit and scope of the present invention.

I claim:

1. An assembly of a portable electronic device and a protective foldable cover with a built-in membrane keyboard, comprising:

the main body of a portable electronic device; the portable electronic device being a cellular phone; said main body having a front surface, a back surface and two lateral side surfaces;

the protective foldable cover, attached structurally in a foldable manner to the main body, having a back leaf entirely covering the back surface when the protective foldable cover is folded and unfolded and a foldable leaf entirely covering the front surface of the main body when the protective foldable cover is folded;

the membrane keyboard, mounted to the foldable leaf and connected signally in a predetermined connection means with the main body; said membrane keyboard being in a laminating form to comprise an upper thin-film PCB layer, a spacer layer and a lower thin-film PCB layer; said membrane keyboard having a thickness less than 2.0 mm and being substantially the same size as an inner surface of the foldable leaf which in turn is substantially the same size as the front surface of the main body; and a folding means for providing at least one stand state for the main body to stand on the foldable leaf of the protective foldable cover and to present the membrane keyboard completely to a position in front of the main body;

wherein, said folding means comprises a sliding mechanism constructed along at least one of said lateral side surfaces of said main body; the sliding mechanism further comprises a pivotal end located at a lower end of the lateral side surface, a sliding groove furnished on and extending along the lateral side surface, a slider end sliding along said sliding groove at the lateral side surface, a first pivotal bar and a second pivotal bar; one end of said first pivotal bar is pivotally connected to one end of said second pivotal bar; the other ends of said first and second pivotal bars are pivotally connecting to the slider end and the pivotal end respectively.

2. The assembly of a portable electronic device and a protective foldable cover with a built-in membrane keyboard according to claim 1, wherein said predetermined connection means is chosen from one of the following: a USB connection means, a connection means wired through said protective foldable cover, a wireless connection means applying signals in radio frequencies, a wireless connection means applying signals in infra-red frequencies, a wireless connection means applying signals in ultrasonic frequencies, and a Bluetooth connection means.

3. The assembly of a portable electronic device and a protective foldable cover with a built-in membrane keyboard according to claim 1, wherein said membrane keyboard has a thickness ranged from 0.4 mm to 2.0 mm.

4. The assembly of a portable electronic device and a protective foldable cover with a built-in membrane keyboard according to claim 1, wherein said membrane keyboard has a thickness ranged from 0.4 mm to 0.8 mm.

5. The assembly of a portable electronic device and a protective foldable cover with a built-in membrane keyboard according to claim 1, wherein said sliding groove further has a plurality of anchoring recesses for said slider end to lock on said sliding mechanism.

\* \* \* \* \*